UNITED STATES PATENT OFFICE.

THEODOR LICHTENHAHN, OF BASEL, SWITZERLAND, ASSIGNOR TO ELEKTRIZITATS-WERK LONZA, OF GAMPEL AND BASEL, SWITZERLAND.

PROCESS FOR THE MANUFACTURE OF ETHYL ALCOHOL FROM ACETALDEHYDE.

1,403,794. Specification of Letters Patent. Patented Jan. 17, 1922.

No Drawing. Application filed July 28, 1921. Serial No. 488,165.

*To all whom it may concern:*

Be it known that I, THEODOR LICHTENHAHN, a citizen of the Swiss Republic, and resident of Basel, Switzerland, have invented a new and useful Process for the Manufacture of Ethyl Alcohol from Acetaldehyde, (for which I have filed applications in Switzerland Oct. 27, 1918; in England Aug. 8, 1919; in France Aug. 8, 1919; in Italy Aug. 8, 1919; in Germany Nov. 16, 1918,) of which the following is a full, clear, and exact description of the same.

By a known process alcohol is made by passing vapour of acetaldehyde and hydrogen over a contact body and it has been shown that a particularly high yield of alcohol per unit volume of the reaction chamber may be obtained if acetic acid or substances likely to form acetic acid, such as oxygen, are excluded. However, when care is taken to exclude oxygen completely from the mixture of gases, the alcohol produced contains ether which is objectionable when the alcohol is designed for certain purposes. Furthermore, when the process is conducted with the use of a large excess of hydrogen which is kept in circulation in the process, there is a further objection, consisting in the accumulation of impurities which are produced by an almost imperceptible decomposition of the acetaldehyde into $CH_4$, $CO_2$ and CO. Among these impurities the carbon monoxide acts injuriously on the catalyst in such a way that the activity of the latter decreases in the proportion as the carbon monoxide increases. The yield of alcohol referred to the amount of aldehyde used is thus diminished and in consequence there is an increase in the proportion of aldehyde in the condensed product.

By the present invention these two objections are avoided and alcohol free from ether is obtained by passing over the contact body a mixture of acetaldehyde, excess of hydrogen and up to 0.3 per cent, of oxygen, and carrying out the process for the rest according to the indications of U. S. Patent No. 1311824, that is to say removing the heat of reaction, at least in part, and after separating the alcohol formed, returning the excess hydrogen to the operation by means of a circulating device. As a rule a few hundredths per cent of oxygen in the mixture suffices for avoiding the aforesaid objections. Ether is no longer produced and the decrease of the activity of the contact body, owing to the presence of carbon monoxide, practically disappears. The water produced by the combustion of the oxygen is not in itself the origin of the favourable effect. Thus the known addition of water vapour has nothing to do with the phenomena herein described. Whether and how far the two different effects of the oxygen, namely the avoidance of the formation of ether and the protection of the catalyst, stand in relation to each other is a purely scientific question which need not here be discussed.

The temperature of the reaction chamber is advantageously kept between 90° and 170° C. because below 90° C. the formation of alcohol is too slow, while above 170° C. the decomposition of acetaldehyde rapidly increases. As the reaction is accompanied by evolution of heat provision must be made for the removal of heat, which may be done by cooling. It is advantageous for the production of alcohol to use the hydrogen in manifold excess over the stochiometric proportion necessary, because such an excess favours a more complete reduction of the acetaldehyde, as stated in U. S. Patent No. 1311824. In order to avoid a cooling device, which would complicate the apparatus and the working therewith, the hydrogen may be used according to U. S. Patent No. 1311824 in such an excess that the heat of reaction can be absorbed and removed thereby.

The following experimental data illustrate the effect of the oxygen. In one experiment, in which oxygen was completely eliminated from the mixture of gases, conducted over heated nickel, there was obtained immediately after starting the operation a yield of alcohol amounting to 95 per cent of the proportion to be theoretically expected. The condensed alcohol contained 2.6 per cent of ether and 1.5 per cent of aldehyde; in the course of about 10 hours the yield fell to 78 per cent and the condensed products contained about 18 per cent of aldehyde. About 0.1 per cent of oxygen was now added to the gases, whereupon the yield rose at once to about 98 per cent and remained constant at this figure. The product of condensation contained now only 0.3 per cent of ether and 0.8 per cent of aldehyde. When, however, the mixture of gases containing oxygen was passed over heated nickel, whereby the oxygen was reduced to water, ether appeared again at once, the yield gradually fell and the amount of aldehyde in the condensed products rose. On again adding oxygen, the ether vanished and simultaneously the activity of the catalyst was accelerated.

With an essentially improved apparatus the following results were obtained after the operation had been in progress for about 6 hours.

|  | Experiment No.— | | | | |
| --- | --- | --- | --- | --- | --- |
|  | 66–67 | 68 | 69 | 70 | 71 |
| Percentage of oxygen in the gases used | 0 | 0.06 | 0.06 | 0.1 | 0.1 |
| Added water, per cent of the condensed products | 0 | 0 | 2.6 | 0 | 2.6 |
| Yield of alcohol, per cent of the aldehyde | 88 | 92 | 93 | 94.8 | 95.2 |
| Content of aldehyde in the condensed products | 2% | 0.15% | 0.6% | 0.08% | 0.07% |
| Content of ether in the condensed products | 3.5% | 1.5% | 1.5% | 0.5% | 0.5% |

Whereas in an experiment analogous to No. 66–67 the yield fell after about 30 hours nearly to zero, that is to say the condensed products consisted practically only of aldehyde, in an experiment which lasted for 211 hours, wherein 0.15 per cent of oxygen was used, there was an average yield of 95 per cent alcohol calculated on the proportion theoretically obtainable, its content of aldehyde being 0.08–0.1 per cent.

It may be remarked that an intentional addition of 0.1 per cent of carbon monoxide diminished the reaction strongly in a few minutes, but after addition of 0.05 per cent of oxygen it was at once restored, without diminishing the carbon monoxide which was still contained in the gases issuing from the apparatus. The origin of the effect of the oxygen, therefore, cannot be attributed to the complete oxidation of carbon monoxide to carbon dioxide, which for the rest cannot be complete because of the state of the water gas equilibrium; thus there is a quite unexpected typical action of the oxygen.

What I claim is:—

1. A process for the manufacture of ethyl alcohol, substantially free from ether, by reducing actaldehyde by means of hydrogen in excess by passing a gaseous mixture of these substances over a contact body, removing the heat of reaction, at least in part, and returning, after separation of the alcohol produced, the excess of hydrogen to the operation by a circulating device, wherein there is added to the gaseous mixture up to 0.3 per cent of oxygen.

2. A process for the manufacture of ethyl alcohol, substantially free from ether, by reducing acetaldehyde by means of hydrogen in excess by passing a gaseous mixture of these substances over a contact body, removing the heat of reaction, at least in part, and returning, after separation of the alcohol produced, the excess of hydrogen to the operation by a circulating device, wherein there is added to the gaseous mixture up to 0.3 per cent of oxygen and the temperature of the reaction chamber is maintained between 90° C and 170° C.

3. A process for the manufacture of ethyl alcohol, substantially free from ether, by reducing acetaldehyde by means of hydrogen in excess by passing a gaseous mixture of these substances over a contact body, removing the heat of reaction, at least in part, and returning, after separation of the alcohol produced, the excess of hydrogen to the operation by a circulating device, wherein there is added to the gaseous mixture up to 0.3 per cent of oxygen and removing the heat of the reaction, at least in part, by cooling.

4. A process for the manufacture of ethyl alcohol, substantially free from ether, by reducing acetaldehyde by means of hydrogen in excess by passing a gaseous mixture of these substances over a contact body, removing the heat of reaction, at least in part, and returning, after separation of the alcohol produced, the excess of hydrogen to the operation by a circulating device, wherein there is added to the gaseous mixture up to 0.3 per cent of oxygen and the heat of the reaction is, at least in part, removed by using the hydrogen in such excess that it absorbs and removes heat of reaction and thereby keeps the temperature of the reaction chamber between 90° C and 170° C.

In witness whereof I have hereunto signed my name this 9th day of July, 1921, in the presence of two subscribing witnesses.

THEODOR LICHTENHAHN.

Witnesses:
FRIEDR. KURZ,
W. KAPPELER.